United States Patent [19]

Long et al.

[11] Patent Number: 5,096,942

[45] Date of Patent: Mar. 17, 1992

[54] ORGANIC/INORGANIC COMPOSITES

[75] Inventors: Timothy E. Long, Hilton, N.Y.; Larry W. Kelts, Knoxville, Pa.

[73] Assignee: Eastman Kodak Company, Rochester, N.Y.

[21] Appl. No.: 529,286

[22] Filed: May 29, 1990

[51] Int. Cl.⁵ .............................................. C08K 9/06
[52] U.S. Cl. .................................. 523/212; 428/407; 525/105; 525/106
[58] Field of Search ................... 523/212; 428/407; 525/105, 106

[56] References Cited

U.S. PATENT DOCUMENTS 3,655,598 4/1972 Antonen et al. ...................... 260/18
3,817,911 6/1974 Taylor .................................. 260/38

OTHER PUBLICATIONS

Schmidt, *Journal of Non-Crystalline Solids* 73 (1985), 681-691.

Huang et al and Glaser et al, Polymer Bulletin 14, 557-564.

Mark, ChemTech Apr. 1989, pp. 230-233.

Laible et al, Advances in Colloid and Interface Science, 13ournal of Non-Crystalline Solids 73 (1985), 681-691.

*Primary Examiner*—Bernard Lipman
*Attorney, Agent, or Firm*—Robert L. Walker

[57] ABSTRACT

Polymers such as phenyltrimethoxysilylterminated polystyrene are prehydrolyzed and then condensed with a metal alkoxide using acid catalyzed sol-gel reactions. The product is an organic/inorganic composite in which a metal polycondensate core is covalently bonded to a plurality of organic arms. The core has more metal atoms than heretofore obtainable. The process of this invention provides a means for introducing an inorganic phase into an organic polymer and maintaining solubility of the resulting composite in organic solvents. The products of this invention have a larger organic phase than products discussed in the literature. They also have residual chemical reactivity.

10 Claims, 4 Drawing Sheets

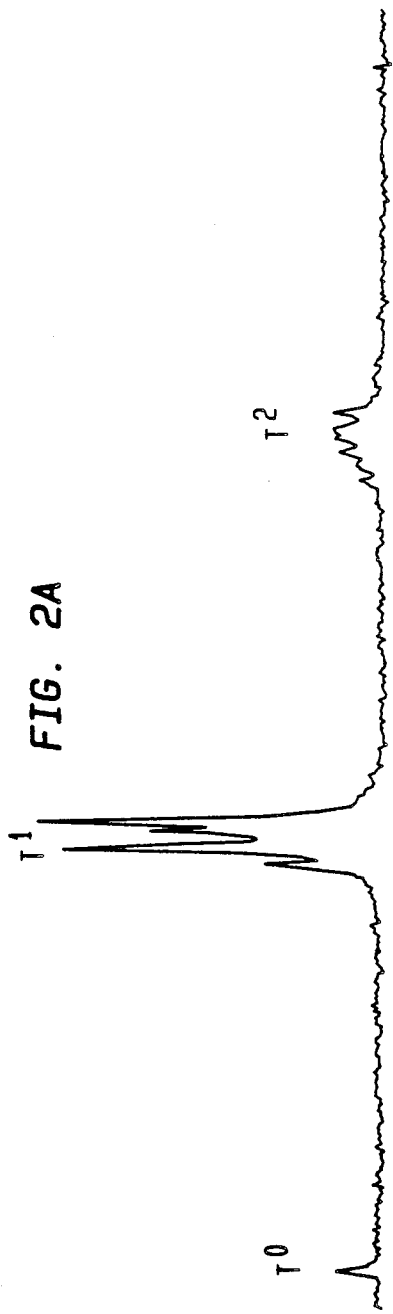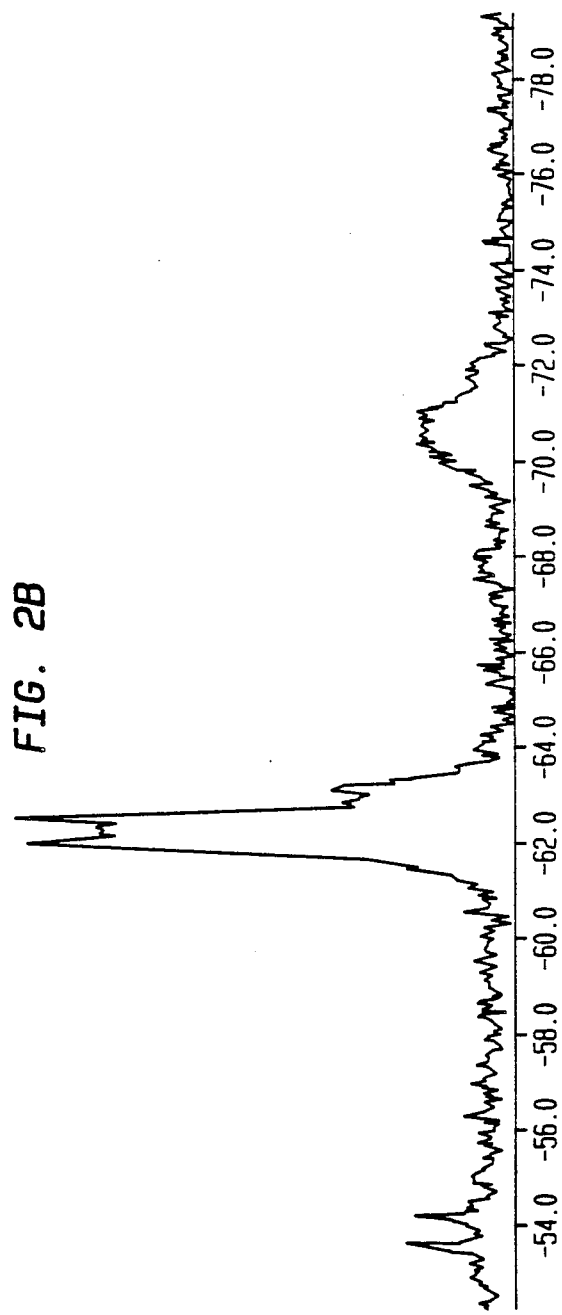
FIG. 2A
FIG. 2B

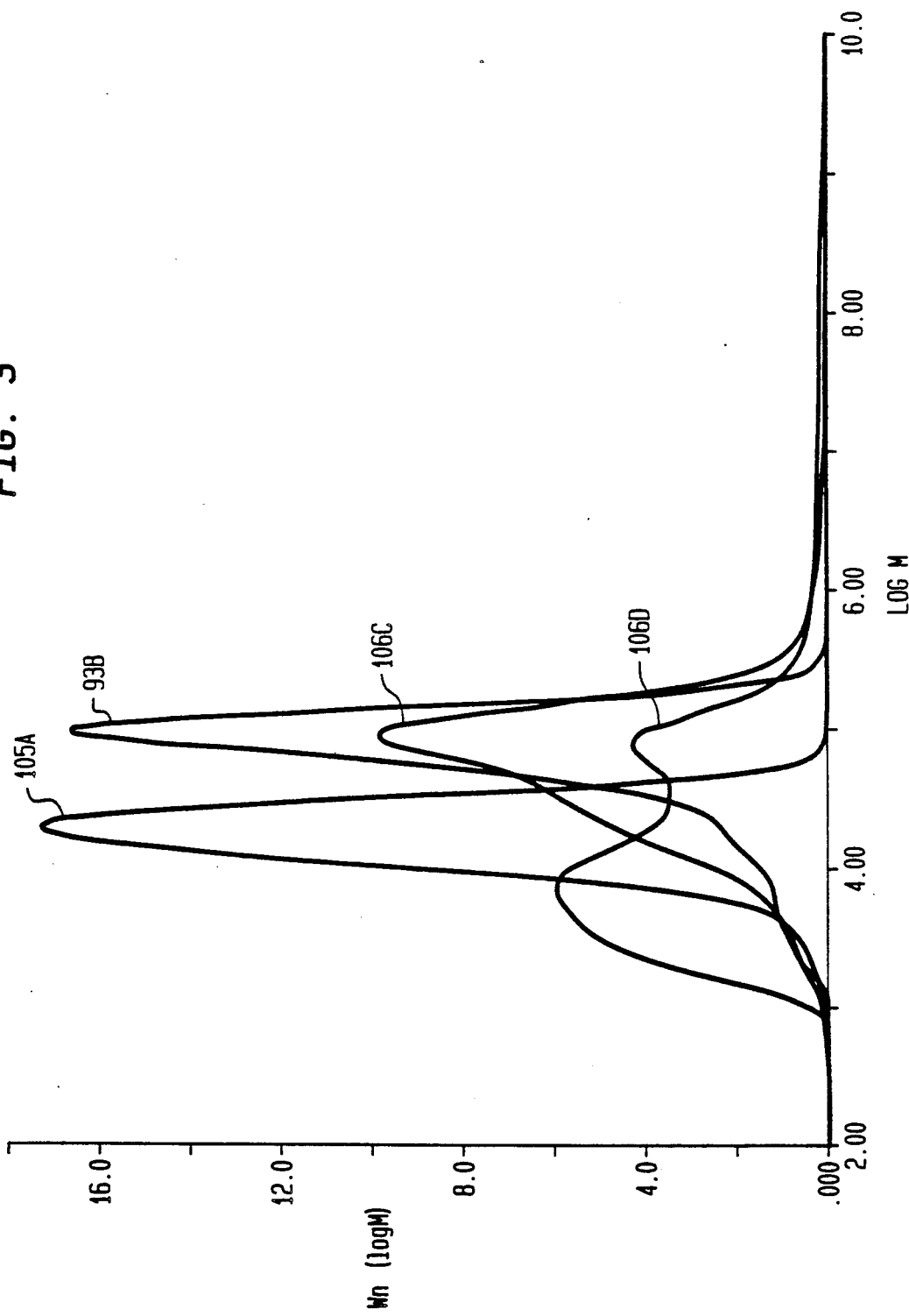

ORGANIC/INORGANIC COMPOSITES

CROSS REFERENCE TO RELATED APPLICATION

This invention relates to a use of end-capped polymers disclosed in application Ser. No. 311,663, filed Feb. 16, 1989, for Timothy E. Long and S. Richard Turner. Timothy E. Long is one of the co-inventors herein. This invention and the invention described in the cited previous application are commonly assigned.

FIELD OF THE INVENTION

This invention relates to organic/inorganic composites. More specifically it relates to compositions of matter which have an organic portion and an inorganic portion. The compositions of this invention are non-network in nature. The compositions provided by this invention have an inorganic core to which organic arms are attached by Si—O—M bonds (M=a metal).

This invention also relates to a process for preparing the composites of this invention. The process of this invention comprises (a) reacting water (preferably in an aqueous acid) with a mono-telechelic polymer having an $Si(OR)_3$ group at one end to form a prehydrolyzed intermediate, and (b) reacting the prehydrolyzed intermediate with a metal alkoxide (or similar compound such as a metal halide) to make the composite of the invention. Thus, the process of this invention is a type of sol-gel process.

BACKGROUND OF THE INVENTION

In application Ser. No. 311,663, filed Feb. 16, 1989, now U.S. Pat. No. 4,933,391, new end-capped polymers are described. Those polymers have the formula $T-P-E_a-(CH_2)_n-Si(OR)_3$, wherein T is selected from an initiator fragment, each R is independently selected from hydrogen and straight chain alkyl radicals having up to about 4 carbon atoms, E is a benzyl group or substituted benzyl group having up to about 12 carbon atoms, a is a whole number having a value of 0 or 1, n is a whole number having a value of 0 to 4, and P is a poly(vinylaromatic) or poly(diene) chain. The instant invention makes use of such polymers (wherein T is an initiator fragment, a equals 1, and n=0) as starting materials for preparing organic/inorganic composites. The composites of this invention comprise an inorganic core to which is bonded a plurality of organic polymer arms. Such products have not been made prior to this invention.

RELATED ART

Antonen, U.S. Pat. No. 3,655,598 discloses use of trialkoxysilyl difunctional polybutadiene oligomers which are co-condensed with Si—OH functional resins to form a network which is insoluble.

Taylor, U.S. Pat. No. 3,817,911 makes composites by a simultaneous synthesis of an organic polymer and a metal oxide precursor. The system is a physical blend.

H. Schmidt, *Journal of Non-Crystalline Solids* 73 (1985) 681–691, furthers the concept of use of the sol-gel process to prepare compositions having inorganic and organic components. The organic part of the composite is contributed by the organic group in a trialkoxysilane, $RSi(OR')_3$. Schmidt does not employ a telechelic, trialkoxysilyl functionalized polymer, nor use such a polymeric chain as a solubilizing agent for the composite.

Huang et al. and Glaser et al., *Polymer Bulletin* 14, 557–564 (1985) and *Polymer Bulletin* 19, 51–57 (1988) prepare insoluble network structures using low molecular weight monomers such as tetraalkoxysilane and titanium isopropoxide in combination with oligomeric and polymeric materials.

Mark, *ChemTech* April 1989, pp. 230–233, discloses a process for making a network which comprises reacting surface hydroxyls on silica filler particles with difunctionalized triethoxysilyl terminated poly(dimethylsiloxane). The networks are insoluble.

Laible et al., *Advances in Colloid and Interface Science*, 13 (1980), pps. 65–99, is similar to Mark. It teaches attaching a trialkoxysilyl monofunctionalized polymer to a silica particle.

None of this art discloses or suggests the non-network soluble composites of this invention. Thus, the composites of this invention differ from the prior art in numerous ways. First, the materials of the invention are not physical blends; in other words, the inorganic and organic portions of the composites are bonded by covalent bonds (Si—O—M).

Secondly, the materials of this invention are not composites made by attaching a substance to a preformed silica particle. Instead, central cores of this invention are formed in situ while the polymeric arms are being attached to the core. The products of this invention are soluble in organic solvents; thus, they markedly differ from insoluble network materials of the prior art. Unlike products disclosed in some of the references mentioned above, the organic portion of the products of this invention are not within a network. Moreover, the products of this invention are made from polymeric precursors which contain a polymeric chain of organic groups, a terminal silicon-containing group at one end of the chain, and a linking group that bridges the chain and the silicon-containing group. Prior art composites do not comprise such polymeric arms linked to a core of a metal polycondensate. Furthermore, the core in products of this invention has an appreciable number of Si—OH groups, or similar groups of other metal(s), and therefore it has voids which allow other molecules to enter and/or react. Composites having a plurality of polymeric arms bonded to such a core were unknown prior to this invention.

SUMMARY OF THE INVENTION

This invention relates to a new type of polymeric composite. In the composites of this invention there is an inorganic core which has a plurality of metal atoms. Some of these atoms are contributed by a hydrolyzable precursor such as a metal alkoxide. Other metal atoms are contributed by a prehydrolyzed polymer that is made by hydrolyzing under acid conditions, a polymer that has a silicon-containing group on one end of the polymeric chain. In addition to being attached to the polymeric chain, the silicon atom (in the starting materials) is attached to hydrolyzable groups which are utilized as reactive sites in the preparative process of this invention.

The inorganic core in composites of this invention is a metal polycondensate as stated above; it has an appreciable number of Si—OH groups or hydroxy groups of other metal(s). These groups can be used as reactive sites to bond the core to other molecules. The core has voids because of these groups; consequently materials which can react with the —OH groups can enter the core. Stated another way, the voids enhance bonding of the core to other materials. The materials of this invention are highly useful as reactive polymers.

In the composites of this invention, the core is bonded to a plurality of polymeric arms. These arms are of controlled molecular weight. They are made by anionic chain polymerization, and then functionalized by reactions which link the silicon-containing group to the end of the chain. The number of arms bonded to the core can be quite large, e.g. 30 or 40, or more.

The products of this invention are soluble in organic solvents. Thus, the products of this invention can be used to prepare films and coatings by removal of solvent from a solution of the composite. If desired, the films and coatings can be treated with one or more other materials that react with the Si—OH groups (or M—OH groups) in the core. Thus, this invention provides reactive coatings and films.

In an important aspect, this invention provides means for making films and coatings that contain an appreciable inorganic content. Such products are not readily prepared from prior art materials, viz the insoluble networks known in the art. Accordingly, this invention provides a means for making metal oxide-containing film and coating products. Stated another way, this invention provides a means to solubilize a metal oxide particle in an organic solvent. Thus, this invention provides a significant advance in the art. This advance is readily adaptable by industry in the production of barrier layers and abrasion resistant coatings and films.

More specifically, this invention provides soluble coating materials. Because the products of this invention are highly branched, they can have lower solution viscosities or melt viscosities, compared to similar materials of comparable molecular weight.

By use of selected metal polycondensate cores, an operator can use this invention to provide coatings or films having "tailor made" indexes of refraction.

Coatings of this invention have good surface adhesion and scratch resistance. Their residual functionality provides for use as intermediates for forming other materials useful as coatings or films.

As discussed more fully herein, products of this invention can have narrow molecular weight distributions. Thus, they can be used in many applications where polymeric materials of that type have an advantage.

BRIEF DESCRIPTION OF THE DRAWINGS

FIG. 1 is a $^{29}$Si NMR spectrum of a prehydrolyzed polystyrene arm prepared from one which had a

terminal group. The spectrum was obtained after the polymer had been prehydrolyzed (for 0.9 hour at ambient temperature) with four equivalents of water per equivalent of silicon. The water was added as 1M HCl. As shown by the Figure, 59% of the product is completed hydrolyzed monomer and 41% is completely hydrolyzed dimer. Such a prehydrolyzed intermediate is an ideal material for reaction with a faster reacting metal alkoxide. These prehydrolyzed intermediates are used with advantage in the process of this invention.

Figure 1:
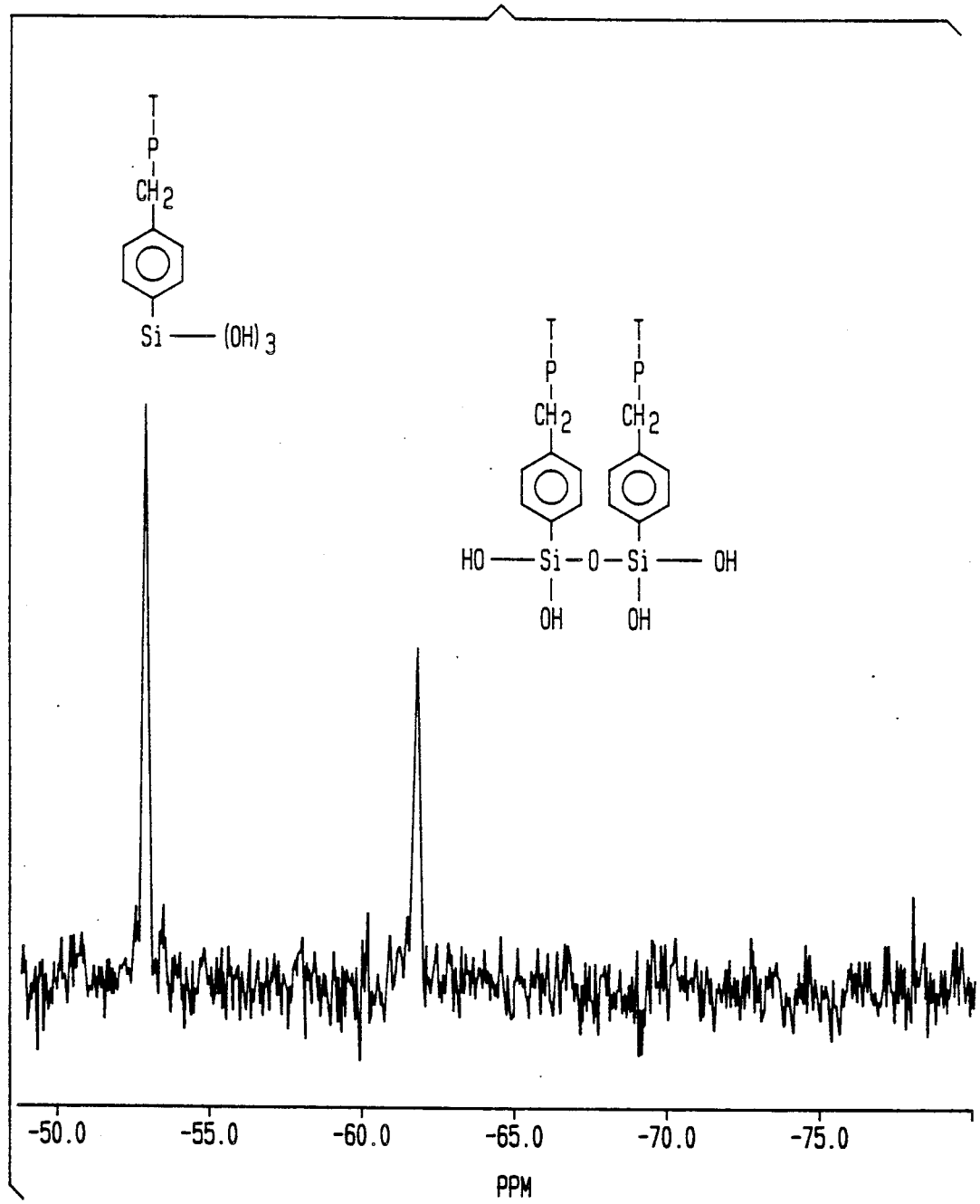

In FIG. 1 is a formula for the monomer (approximately above the peak attributable to the monomer). The silicon atom in the monomer is a $T^0$ silicon, since it is not attached via an oxygen bridge to any other silicon atom, or atom of another metal. In contrast, each silicon in the dimer is a $T^1$ silicon, since they are attached via an oxygen bridge to another silicon atom.

FIG. 2 contains two polymer spectra. Plot 2A is the $^{29}$Si NMR spectrum of phenyltrimethoxysilyl terminated polystyrene reacted alone for 84 hours with four equivalents of 1M HCl/H$_2$O. Spectrum 2B is the plot for a product made by the same reaction as for 2A except, an hour after adding acidic water, two equivalents of Si(OCH$_3$)$_4$, i.e. "TMOS" were added. The spectrum was taken at $t_o+63$ hours. Extra peaks and peak overlap in 2B indicate the polymer has formed covalent bonds between its terminal silicon and TMOS. The product depicted in 2A is 72% condensed and the product made with added TMOS is 74% condensed, but the products are structurally different in the two cases.

As indicated above, plot 2B shows there is covalent bonding between the inorganic and organic portions of composites of this invention. Thus, materials produced by the process of this invention are not physical blends.

Since the intermediate characterized by spectrum 2B is 74% condensed, 26% of the Si—O— moieties in the 2B product are bonded to either hydrogen or alkyl, which are both reactive. Thus, there are appreciable Si—OR groups available for further reaction. The products of this invention can undergo reaction with substantially any reactant capable of reacting with a hydrogen as active as the hydrogen in a silanol (Si—OH) group. Therefore, as indicated above, products of this invention have extensive use as chemical intermediates.

These uncondensed silicon hydroxides or alkoxides indicate voids in the cores of the composites of this invention. Hence, the inorganic phase in the products of this invention are not equivalent to preformed SiO$_2$ particles. Moreover, the chemical properties of the composites (which are conferred by Si—OR groups in the inorganic cores of this invention) make the products of this invention differ from materials within the prior art.

Although not wishing to be bound by any theory, it is believed that in addition to the monotelechelic nature of the arms, steric factors introduced by the polymeric arms in products and/or reactants of this invention also contribute to the non-network structure of the products of this invention.

Figure 4:
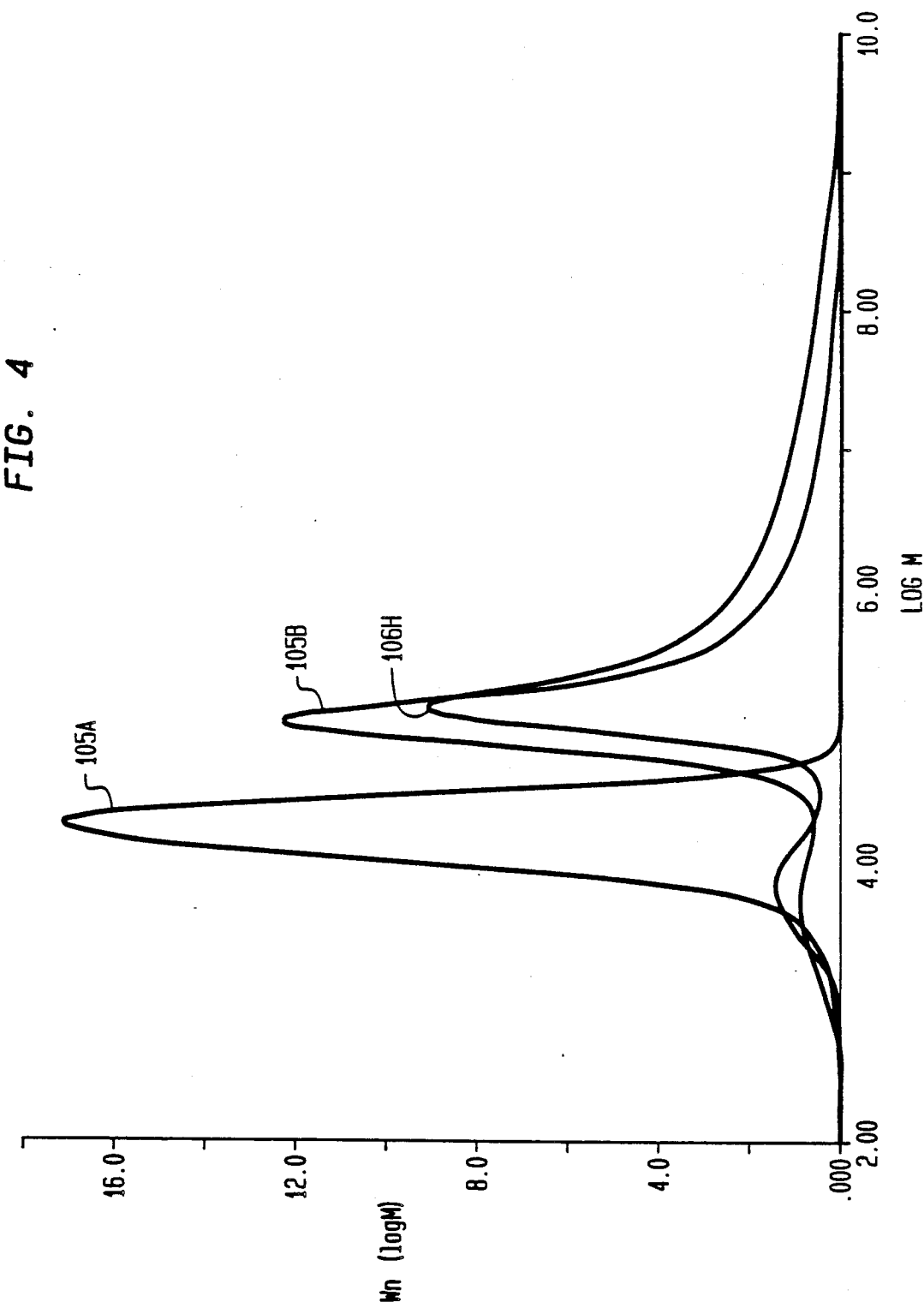

FIGS. 3 and 4 show molecular weight distributions for products of this invention. Both Figures show a plot for a material reacted in the absence of a metal alkoxide (labeled 105A). In FIG. 3, effects of adding various amounts of Si(OCH$_3$)$_4$ are seen. Curve 93B represents a product made from 9.6 weight percent Si(OCH$_3$)$_4$; it still has a relatively narrow molecular weight distribution, but with a significantly higher molecular weight. As more TMOS is added (106C, 15.5 wt. percent; 106D, 34.6 wt. percent), a broader distribution appears on the lower molecular weight side. Once 30 wt. percent is reached, the distribution is bimodal, indicating the presence of some less condensed polymeric arms. $^{29}$Si NMR indicates unreacted TMOS which is not shown in the molecular weight plots in the Figures. Of course, as more alkoxide is added, more water needs to be added for complete hydrolysis, and larger molecular weight products are expected.

Addition of titanium and zirconium instead of silicon results in polymers with broader molecular weight distributions on the high molecular weight side (FIG. 4). In FIG. 4, plot 105B is for a product of this invention produced as described above with 10.5 wt. percent titanium(n-butoxide)$_4$. The material characterized by plot 106H was produced in the same way except that the metal alkoxide used as the inorganic modifier was zirconium(n-butoxide)$_4$.

Plot notations such as "106C", "106D", and the like employed above, and which are used in the drawing, and in portions of text and tables that follow in this Specification, refer to the same material.

DESCRIPTION OF THE PREFERRED EMBODIMENTS

In a preferred embodiment, this invention provides an organic/inorganic composite, said composite having an inorganic core, and a plurality of organic polymer arms chemically bonded to said core, said core being a partially condensed metal polycondensate of silicon, zirconium, aluminum, titanium, lead, boron, or tin, wherein (a) the ratio of metal condensation bonds, M—O—M, in said core to the total number of possible metal condensation bonds is within the range of from about 0.7 to about 0.9, and (b) the metal non-condensation bonds, M—OR, R is selected from hydrogen and lower alkyl groups of up to about four carbon atoms;

said core being further characterized by having a metal content such that the ratio of moles of silicon contributed by the ends of said polymer arms bonded to said core, to the total moles of metal in said core is within the range of from about 0.25/1 to about 4/1;

said core being still further characterized by being from about 5 to about 30 weight percent of said composite;

said arms having the formula:

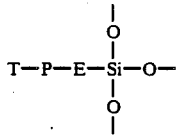

wherein (a) the silicon atom is a metal atom contributed by the end of the polymer arm to said core, (b) at least one of the Si—O— bonds is bonded directly to said core, or indirectly to said core through another silicon atom in another polymer arm, and any remaining Si—O— bonds are attached to R wherein R is as defined above, T is selected from an initiator fragment, P is a poly(vinylaromatic) or poly(diene) chain, and E is a benzyl group or a substituted benzyl group having up to about 12 carbon atoms;

said composite being further characterized by each of said polymer arms having a molecular weight of from about 1000 to about 100,000, and the average number of arms bonded to said core being from about 3 to about 50, or more.

In another preferred embodiment, this invention provides a process comprising two steps.

the first step comprising reacting (i) one mole portion of an end-capped polymer having the formula: T—P—E—Si(OR)$_3$ wherein T is selected from an initiator fragment, each R is independently selected from hydrogen and straight chain alkyl radicals having up to about 4 carbon atoms, E is a benzyl or substituted benzyl group having up to about 12 carbon atoms, and P is a poly(vinylaromatic) or poly(diene) chain, with (ii) about 4 mole portions of water in the presence of an acid catalyst to prepare a prehydrolyzed intermediate with about 50 to about 100 percent of the number of (OR) groups converted to OH; and in a second step, reacting said intermediate with a hydrolyzable metal compound MX$_n$ wherein M is selected from Si, Zr, Ti, Al, Pb, B, or Sn, X is a hydrolyzable group selected from halogen and alkoxy groups of one to about four carbon atoms, and n is the metal valence;

said second step being further characterized by (i) the mole ratio of MX$_n$ to said intermediate being from about 0.25 to 1 to about 4 to 1, and (ii) being conducted in the presence of an acidic catalyst and sufficient water to hydrolyze said metal compound, whereby an organic/inorganic composite is formed.

As indicated above, this invention relates to a use (as a starting material) of an end-capped polymer having the formula

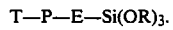

These polymers are made by bonding an endcapping group to a polymeric chain previously formed by an anionic living polymerization. The living polymerization is conducted using an olefinic unsaturated monomer and a univalent anionic initiator. Preferably an alkyllithium, alkylsodium, or alkylpotassium initiator is used.

Many unsaturated monomers containing carbon-to-carbon double bonds can be polymerized using anionic initiators to yield living polymers. These include conjugated and non-conjugated dienes and vinyl-substituted aromatic compounds. Some illustrative, but non-limiting examples of useful dienes include the conjugated dienes having up to about 18 carbons, such as 1,3-butadiene, isoprene, 1,3-pentadiene, 2-phenyl-1,3-butadiene, 1,3-octadecene, and the like. Illustrative, but non-limiting examples of vinyl substituted aryl monomers include styrene, 4-methylstyrene, 4-tert-butylstyrene, 4-decyclstyrene, α-methylstyrene, 2-vinylnaphthalene, and other vinyl substituted aromatics having up to about 18 carbon atoms.

It will be understood by a skilled practitioner that the living polymers used as intermediates in this invention can be homopolymers, copolymers, or block copolymers.

The living polymerization is conveniently carried out at a temperature of from about −85° C. to about 120° C. The polymerization is also conveniently carried out in a liquid ether or an aliphatic hydrocarbon which does not react with the catalyst. Tetrahydrofuran, cyclohexane, petroleum ether, and the like can be used. When a reaction medium, such as tetrahydrofuran has a tendency to react with material(s) used in the process, such an undesirable side reaction can be minimized in some instances by conducting the process at a low temperature. Hence, one may use a reaction temperature as low as about −78° C. or lower when tetrahydrofuran is employed as the reaction medium.

Further details concerning the preparation of living polymers of the type used in this invention are available in the art, e.g., U.S. Pat. Nos. 3,956,419; 4,371,670; 4,379,891; 4,408,017; and 4,618,650. The descriptions of living polymers and methods for their formation within those patents are incorporated by reference herein as if fully set forth.

Turning now to the endcapping process, it can be applied to anionic living polymers having any molecular weight. Hence, the molecular weight is not a critical variable in the end-capping process. For convenience, it is preferred that the metal terminated polymer P—$M^1$ have a polymeric chain with a molecular weight in the range of from about 500 to about 1,000,000, more preferably from about 1,000 to about 100,000. (Above, $M^1$ refers to a univalent metal such as lithium, sodium, or potassium.)

Several criteria must be met for the selection of a suitable functionalization (endcapping) reagent. First, an electrophilic site for direct deactivation of the polymeric carbanion must be present in the molecule. Also, the reaction should be quantitative or nearly quantitative, in order to maximize the efficiency of subsequent formation of condensed products. In addition, the efficiency of the functionalization reaction should be characterizable by a variety of complimentary techniques, e.g. spectroscopic and chemical.

p-(Chloromethylphenyl)trimethoxysilane (CMPTMS), has been found to meet the above structural prerequisites. Other endcapping agents contemplated for use in this invention are compounds related to CMPTMS. They are discussed below.

For this invention endcapping agents are selected from those having the formula:

$$X—E—Si(OR)_3$$

wherein X is a halogen radical selected from fluoride, chloride, bromide, and iodide, E is a benzyl or substituted benzyl group having up to about 12 carbon atoms, such that said halogen radical is bonded to the alpha carbon atom in said benzyl or substituted benzyl group, and R is an alkyl radical of up to about 4 carbon atoms.

As indicated above, endcapping agents of this invention comprise a benzyl configuration;

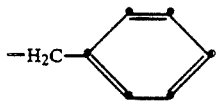

The ring may be further substituted with groups which do not interfere in the reaction, e.g. one or more alkyl groups.

Examples of endcapping agents useful in this invention are o-(chloromethylphenyl)trimethoxysilane, p-(chloromethylphenyl)trimethoxysilane, the triethoxy, tripropoxy, and tributoxy analogs of these compounds, o-(bromomethylphenyl)trimethoxy silane, and p-(bromomethylphenyl)trimethoxysilane. Compounds containing alkyl groups such as methyl, ethyl, and n-hexyl bonded to the ring are also useful. The end-capping agent may be a mixture of compounds; for example it may be a mixture of isomers such as 90% p-(chloromethylphenyl)trimethoxysilane and 10% by weight o-(chloromethylphenyl)trimethoxysilane.

The endcapping reaction can be carried out in the reaction medium in which the metal terminated polymer is formed. The reaction temperature is not critical. It has been conducted at −78° C. in tetrahydrofuran and at 60° C. in cyclohexane. Temperatures above and below those temperatures, e.g., from about −85° C. to about 100° C., can be employed if desired. The reaction can be conducted for a reaction time within the range of from about 0.25 to about 2.0 hours. Shorter and longer times can be used if desired.

The endcapping reaction is preferably conducted using an excess (10–100 mole % or more) of the endcapping agent. However, it is not necessary that an excess be used; an exact stoichiometry can be employed, if desired. The process is preferentially conducted at ambient or slightly elevated pressures e.g. 1 atmosphere to about 1.1 atmosphere. Such pressures are not critical, and higher pressures can be used if desired.

The functionalized, i.e. end-capped polymers prepared by reacting the metal terminated polymers and above-described end-capping agents are soluble in a material such as tetrahydrofuran, dimethylformamide, dimethylacetamide, acrylonitrile, N-methylpyrollidone, sulfolane, dimethylsulfoxide, and the like.

Further details concerning the end-capped polymers and their preparation can be obtained from above-cited application Ser. No. 311,363. That document is incorporated by reference herein as if fully set forth.

To prepare the composites of this invention, the end-capped polymers, produced as described above, are to be bonded to a core of metal polycondensate that is formed in situ from a hydrolyzable compound $MX_n$, wherein M, X and n are as defined above. Generally speaking, the alkoxy groups on the end-capped polymers react in a sol-gel hydrolysis/condensation reaction at a slower rate than the hydrolyzable groups in $MX_n$. In order to make the rate of reaction more balanced, the end-capped polymer is subjected to a prehydrolysis, which forms Si—OH groups available for condensation. Thus, for the purposes of this invention, a prehydrolyzed intermediate is produced and reacted with one or more materials having the formula $MX_n$.

The conditions utilized to conduct the prehydrolysis are not critical. One may use any set of conditions which gives the desired amount of hydrolysis. In general, conditions are selected which favor hydrolysis over condensation.

The differences between hydrolysis and condensation are well known to a skilled practitioner, and they may be illustrated by the following equations:

Hydrolysis

(1) R′Si(OR)₃ + 3H₂O ⟶ R′Si(OH)₃ + 3ROH

Condensation

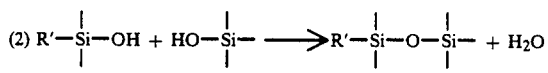

As can be seen, equation (1) illustrates complete hydrolysis of a trialkoxysilane such as a trimethoxysilane or triethyoxysilane. As shown, for each mole equivalent of trialkoxysilane employed, three moles of water are required for complete hydrolysis (ignoring any water produced by condensation, e.g. Equation (2)).

Equation (2) illustrates a condensation process: two silanol (≡Si—OH) groups react to form an Si—O—Si group and split out a molecule of water. For the purpose of this invention, the left-most reactant on the left hand side of equation (2) is a prehydrolyzed intermediate wherein R' signifies T—P—E—, as defined above and R is as defined above.

It is to be understood that the right hand reactant in equation (2) need not be a silicon-containing species. It can be $MX_n$ or a hydrolyzed or partially hydrolyzed compound of $MX_n$. In addition, it is to be pointed out that the right hand silicon reactant in equation (2) can be derived by hydrolysis from $SiX_4$ compounds (wherein X is as defined above) or it can be provided by another molecule of the prehydrolyzed intermediate produced in equation (1).

For purposes of this Specification, certain terminology is employed to describe features of this invention which are illustrated by equations (1) and (2). Thus, Si—OR and Si—OH bonds illustrated by equation (1) are termed "non-condensation bonds." In such bonds silicon is not linked through an oxygen bridge to another metal atom. On the other hand, bonds in which metal atoms are linked through an oxygen bridge to form M—O—M groups, wherein each metal atom M is alike or different and is selected from the metals represented by M as stated above, are called "metal condensation bonds." An illustrative M—O—M group is the Si—O—Si group which appears in the product depicted on the right side of the arrow in equation (2). An M—O—M group (Si—O—Si for example) contains two metal condensation bonds.

The products and intermediates in the process of this invention can be characterized by the following ratio:

$$p = \frac{\text{actual number of metal condensation bonds}}{\text{total number of possible condensation bonds}}$$

The actual number of metal condensation bonds can be obtained by $^{29}Si$ NMR spectroscopy, using regions of the spectrum illustrated by FIGS. 1 and 2. The reaction can be followed by using $^{29}Si$ NMR analysis to determine the number of metal condensation bonds formed.

The total possible condensation bonds that can be formed can be calculated from the moles of hydrolyzable metal compound times the number of replaceable groups in the molecule that can condense. As an illustration, for the polymeric silicon-containing reactant T—P—E—Si(OR)$_3$, the total possible metal condensation bonds is (number of moles) X 3.

Likewise, for silicon compounds such as $Si(OCH_3)_4$, or $Si(OC_2H_5)_4$ or similar tetralkoxysilane, the total number of possible metal condensation bonds is equal to the number of moles X 4. Thus for each mole of $MX_n$, the number of possible metal condensation bonds is equal to n. When M is not silicon, and is another metal such as Al, Ti and Zr that can increase its condensation sphere, a larger number of metal condensation bonds is possible.

The reaction conditions employed to conduct the prehydrolysis step in the process of this invention are not critical. One generally uses reaction conditions that favor hydrolysis over condensation and conducts the reaction under the selected set of reaction conditions to achieve the desired rate of hydrolysis. In general, one adds enough water to the reaction and conducts the process so that on a theoretical basis, all three alkoxy groups on the T—P—E—Si(OR)$_3$ reactant can hydrolyze. Thus, one generally uses at least three moles of water per each mole of polymeric reactant to be hydrolyzed. It is to be understood that less than three moles of water can be employed especially if it is desired to hydrolyze less than all of the alkoxy groups present in the polymeric reactant. In general, one uses at least one mole of water per mole of polymeric reactant, and preferably at least two moles of water. There is no real upper limit on the amount of water to be employed. It is preferred that the amount of water not exceed about 20 moles per mole of T—P—E—Si(OR)$_3$ reactant. Thus, per each mole portion of the polymeric reactant, it is generally preferred to use from about 2.0 to about 6.0 moles of water in the prehydrolysis. However, it is to be recognized that the amount of water employed can be somewhat outside this range.

The prehydrolysis is preferably conducted in an acidic medium. As is known in the sol-gel art, hydrolysis is the fast step under acidic conditions (low pH). The nature of the acid used is not critical. Generally, one may use an aqueous mixture of any protic acid; however volatile, non-oxidizing protic acids are preferred. Thus, for example, acetic, propionic and similar carboxylic acids can be used. Also, acids such as hydrochloric, sulfuric, p-toluene sulfonic acids, and similar acids can also be used. Preferably one uses a sufficiently low pH to favor hydrolysis over condensation. If there is an appreciable amount of condensation, then an appreciable amount of starting polymeric reactant will be transformed into a material with limited available sites for reaction with the $MX_n$ reactant, and the yield of desired product will be reduced. Thus, an operator will add enough acid to the reactor so that the pH* of the prehydrolysis medium is about 3.0 or lower. One can add the water and acid as an aqueous acid. The examples below illustrate adding 4.0 moles of water as 1.0M HCl.

For prehydrolysis, a reaction temperature is selected which gives a suitable reaction rate, and which does not cause an undesirable amount of condensation (of the hydrolyzed starting functionalized polymer). In general, one employs a reaction temperature within the range of from about −35° C. to about 75° C. Temperatures somewhat outside this range can also be employed. Preferably, one employs a reaction temperature within the range of from about −20° C. to about 60° C.

Generally speaking, faster rates of hydrolysis are obtained with higher reaction temperatures. Also, condensation is usually faster with higher reaction temperatures. As indicated above, for the purpose of this invention condensation of the prehydrolyzed intermediate can be objectionable, since it diminishes the ability of this intermediate to react with the $MX_n$ reactant employed in the second step of the process of this invention. Therefore, when selecting a reaction temperature, or a regime of reaction temperatures, one keeps in mind not only the desire to achieve a suitable hydrolysis reaction rate, but also the desire to refrain from producing an unacceptable amount (>50%) of undesired condensation product.

Thus, one chooses a reation temperature (or temperatures) which "balances" (a) the rate of the desired prehydrolysis, with (b) the rate of the undesired condensation of the prehydrolyzed intermediate, so that hydrolysis is heavily favored, and any condensation is maintained within an acceptable amount.

The reaction time is not a truly independent variable, but it is dependent at least to some extent on the other reaction conditions employed; for example, the reaction temperature, the inherent reactivity of the reactant, the efficiency of the catalyst employed, etc. In general, one employs a reaction time that strikes a favorable balance between the hydrolysis that is desired, and (undesired) condensation of the prehydrolyzed intermediate. Such a reaction time can be selected with a limited amount of preliminary experimentation, especially if the reaction results are followed using $^{29}$Si NMR as an experimental tool.

As shown by the examples, a suitable prehydrolysis reaction time can be about one hour. Greater or lesser reaction times can be employed. Thus, reaction times for the prehydrolysis are generally in the range from about five minutes to about five hours. Reaction times somewhat outside this range can be used.

The reaction pressure is not critical. In general, the prehydrolysis is conducted at ambient pressure; however, greater and lesser pressures can be used if desired. For example, one may wish to run the prehydrolysis at a reduced pressure to facilitate hydrolysis, e.g. when the hydrolysis by-product is a volatile species such as methanol or n-butanol. Thus for example, one may use a reaction pressure of from about 0.1 to about 1.0 atmospheres. Pressures above and below this range can also be used.

After the prehydrolysis is conducted, an operator conducts the second step of the process of this invention, that is condenses the prehydrolyzed intermediate with the $MX_n$ reactant.

This second step can involve a partial hydrolysis of the $MX_n$ reactant prior to its condensation; however, it is to be understood that the condensation can at least to some extent occur via an alcohol producing condensation or similar reaction such as illustrated using a silicon tetraalkoxide by equation (3) below.

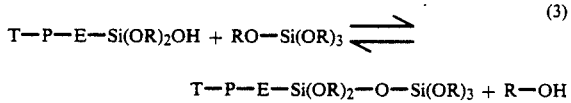

(3)

The R groups in the end-capped polymer reactant and the inorganic modifier may be alike or different. In general, water producing condensations [such as illustrated in equation (2)] are faster than alcohol producing condensations (equation 3), especially in silicon systems; Assink, R. A. et al, *Journal of Non Cryst. Solids* 99 (1988) 359. With other metal alkoxides, alcohol producing condensation reactions become more important. Also, equation (3) and similar reactions can be especially viable when a limited amount of water is present.

Titanium and zirconium alkoxides hydrolyze and condense much faster than silicon alkoxides. When mixed with silicon hydroxides, they can catalyze silicon condensation, or condense rapidly with silicon alkoxides themselves (Eq. 4)

be added all at once or in increments. It is not necessary that the $MX_n$ compound be added to the prehydrolyzed intermediate. If desired, the prehydrolyzed intermediate can be added all at once or in increments to the $MX_n$ compound. However, it is preferred that the $MX_n$ reactant be added to the prehydrolyzed intermediate as illustrated by the examples.

As can be seen by Equation (2), condensation reactions which occur in the process of this invention can result in the formation of by-product water. As shown by Equations (3) and (4), it is not necessary for the condensation of this process to proceed by a water-producing step, since other reactions can also take place in the composite forming part of the process. Furthermore, it is to be understood (i) that the composite forming process of this invention can proceed by a combination of chemical reactions, such as a plurality of reactions illustrated by Equations 2-4 above, and (ii) the process of this invention is not limited to any specific condensation, so long as the condensation is a result of the interaction of the prehydrolyzed intermediate and the $MX_n$ reactant or reactants, and the condensed product of this invention, as described above is formed.

One may conduct the composite forming step in the presence of the acid/water mixture which remains after the prehydrolysis step. It is to be understood that the water necessary for the composite forming step can come from three sources: (1) water present in the acid/water mixture at the end of the prehydrolysis step, (2) water that evolves from the water producing condensation reaction, and (3) water added at the beginning or during the composite forming step. It is often favorable to limit the amount of water present when the $MX_n$ reactant or reactants are added. For example, when an operator wishes to favor condensation via an alcohol-producing reaction, additional water is not added to the reaction mixture employed for the condensation. This is especially true for alkoxides of metals such as Ti and Zr where it is desirable to limit hydrolysis in order to favor condensation with the prehydrolyzed polymer intermediate.

For the condensation between the prehydrolzed intermediate and $MX_n$, reaction is generally conducted at a temperature in the range of from about $-35°$ C. to about $130°$ C. Preferably, the condensation is conducted at a temperature of from about $-10°$ C. to about $75°$ C. Reaction at room temperature or thereabouts is highly preferred in many instances.

The time employed for the composite forming step is not a truly independent variable, but is dependent at

(4)

In this reaction, the R groups in the titanium reactant may be the same as or different from the R groups in the silicon reactant.

This catalytic effect for titanium with silicon tetraethoxide is taught by John D. Basil and Chia-Bheng Lin, "NMR Characterization of Precursors to Chemically Derived Ceramics," in *Better Ceramics Through Chemistry III*, eds. C. Jeffrey Brinker, David E. Clark, and Donald R. Ulrich, Materials Research Society, Pittsburgh, Pa. (1988) pp. 49-55.

A convenient way to conduct the composite forming step in the process of this invention is to add the $MX_n$ compound to the reaction mixture which contains the prehydrolyzed intermediate. The $MX_n$ compound can least in part on the inherent reactivity of the reacting materials, the quantity employed, the catalyst used, and the reaction temperature(s) selected. Generally speaking, this time is from 30 minutes to 250 hours. The reaction pressure can be selected from those pressures discussed above when the prehydrolysis step was described.

It appears that the condensation (within the composite forming process) proceeds in a step-wise manner. More specifically, once the prehydrolyzed intermediate becomes reacted with a molecule of the hydrolysis/condensation intermediate made by reaction of $MX_n$ with the aqueous media [herein referred to as "$M(OH)_n$"], the functionality of the silicon-containing end-group in the polymeric reactant is increased, so that the resulting intermediate is made more reactive toward small molecules containing M—X or M—OH groups, or

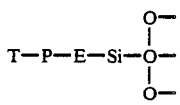

However; because of steric restrictions, the total number of polymeric arms is limited. Since $MX_n$ has reacted with a polymeric prehydrolyzed intermediate, a structure with a larger inorganic nucleus is obtained than can be prepared from T—P—E—Si (OR)$_3$ alone.

The resulting composites are novel systems since they contain a larger inorganic (core) phase than could be made available by prior art methods. A plurality of polymeric organic groups is derived from the T—P—E—Si(OR)$_3$ starting material bonded to the core. Polymer arms which are bonded to the core via an oxygen attached to the silicon atom in the polymer chain are referred to herein as "directly bonded." In some instances a polymer chain can be attached (by an Si—O—Si linkage) to another silicon atom on another polymer chain which is directly bonded to the metal core. In such instances the polymer chain (and its silicon atom) which are not directly bonded to the metal core and are thus termed "indirectly bonded" to the core.

EXPERIMENTAL

A sample of polystyrene polymer

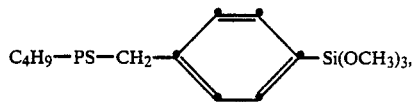

(hereinafter designated "PSph-TMOS") having a molecular weight of 2900 was prepared following the procedure for making such end-capped polymers set forth in above-cited application Ser. No. 311,363, filed Feb. 16, 1989. Approximately 1.0 grams of the polymer dissolved in tetrahydrofuran (approx. 0.075M) was used in all experiments reported in Table 1, 1A and 2 below.

The starting polymer prepared by the procedure referred to in the above paragraph was prehydrolyzed prior to reaction with the inorganic modifier set forth in Tables 1 and 1A. For the prehydrolysis, a 1.0M HCl solution was added to the tetrahydrofuran solution of the polymer in an amount such that the water:silicon ratio was 4:1. The resultant mixture was maintained at 30° C. for 0.5-1.5 hours at atmospheric pressure. The resulting solutions were characterized by $^{29}$Si NMR at the end of the hydrolysis period to ascertain that sufficient hydrolysis (and an acceptably low amount of condensation) had taken place. The spectra obtained were analogous to that set forth in FIG. 1, indicating that the hydrolysis is complete in about one hour.

After prehydrolysis, an inorganic modifier was added to the THF/aqueous mixture of prehydrolyzed intermediate. The inorganic modifiers, and amounts employed are set forth in Tables 1 and 1A. The second step was conducted at 30° C. at ambient pressure for the approximately 36 hours. For all runs, $^{29}$Si NMR was utilized to demonstrate that Si—O—M bond formation had occurred between the organic polymer and the core formed from the inorganic modifier (FIG. 2).

After formation of the organic/inorganic composite as described above, liquid was evaporated from the resultant mixture (ambient temperature for approximately 24 hours) to form a film in the bottom of a polyethylene dish. Then the sample was dried at ambient temperature under vacuum ca. 10 mm Hg for 24 hours. The film was dissolved and characterized by $^{29}$Si NMR and size exclusion chromatography (as set forth below). The NMR information defined the molecular structure of the silicon atoms attached to the organic polymer and the silicon atoms present in the "inorganic core". SEC indirectly indicated that the inorganic monomer and functionalized organic polymer were covalently attached since the resulting molecular weights were higher when inorganic monomer was present. Table 1 depicts the calculated number of organic arms for samples with and without added inorganic modifier monomer.

In additional experiments, the procedure set forth above was repeated to prepare additional samples of the products described in Table 1 made using TMOS as the inorganic modifier. The films produced as set forth above were heated at 120° C. over a weekend to further condense the residual silicon hydroxides. Despite more extensive condensation of the "core" during this heat treatment, the film remained soluble.

CHARACTERIZATION

Molecular weights and molecular weight distributions of the end-capped (i.e. functionalized) polymers were determined by size exclusion chromatography (SEC) in THF at 25° C. A variable temperature Waters GPC was equipped with ultrastyragel columns of $10^3$ Å, 500 Å, and 100 Å for molecular weights less than 5000 g/mole, and $10^6$ Å, $10^5$ Å, $10^4$ Å, and $10^3$ Å for higher molecular weights. A Waters Differential Refractive Index (DRI) was utilized. Polystyrene standards (Polymer Laboratories) were used for the construction of calibration curves. The hydrolyzed/condensed, monofunctional polymers and composites were also analyzed by SEC using a viscometric detector to obtain absolute molecular weights and to determine the extent of condensation.

$^1$H Nuclear magnetic resonance characterization was accomplished using a General Electric QE300 300 MHz NMR Spectrometer. The instrument was equipped with a superconducting magnet and had a 7.05 T field strength. The spectrometer was run by a Nicolet 1280 computer. All samples were referenced to CHCl$_3$ (TMS=0.0 ppm). $^1$H NMR analysis of the end-capped polymer indicates the presence of the trialkoxysilyl group at 3.6 ppm. The presence of the initiator fragment which resides at the other end of the polymer chain is also evident between 0.6 and 1.2 ppm. Either the initiator fragment or the trialkoxysilyl group integration was compared to the repeat unit methylene and methylene integration in order to determine functional molecular weights.

$^{29}$Si NMR spectra were obtained with a Bruker AM-500 instrument at 99.32 MHz. All samples were referenced to tetramethylsilane (TMS). Chromium acetylacetonate [Cr(acac)$_3$] was added at approximately 0.015M to reduce the longitudinal relaxation time (T$_1$) for the $^{29}$Si NMR spectra. The $^{29}$Si NMR spectra were obtained using inverse-gated decoupling (decoupler on during acquisition and off during the relaxation delay)

to suppress any negative nuclear Overhauser effect. The relaxation agent and decoupling sequence facilitated quantitative measurements.

Glass transition temperatures (Tg's) were determined with a 990 DuPont Differential Scanning Calorimeter (DSC) equipped with a data analysis program from Laboratory Micro Systems Inc. Sample sizes ranged between 10-20 mg and the scan rate was 20° C./min. under a nitrogen atmosphere. Tg's were determined at midpoint of the transition. DSC scans were repeated several times and the sample was finally dried in a vacuum oven at 110° C. overnight to ensure equilibrium Tg measurements. Results are reported in Table 2 below.

TABLE 1

| Sample | Wt. % TMOS | Polymer Si $T^0$ | $T^1$ | $T^2$ | $T^3$ | Polymer P | TMOS Si $Q^2$ | $Q^3$ | $Q^4$ | TMOS P | Approx. # Arms |
|---|---|---|---|---|---|---|---|---|---|---|---|
| 105A | 0 | 0 | .16 | .64 | .20 | 0.68 | — | — | — | — | 7 |
| 106B | 6.4 | 0 | .09 | .56 | .35 | 0.75 | .10 | .59 | .31 | .80 | —* |
| 93B | 9.6 | 0 | .20 | .56 | .24 | 0.68 | .13 | .53 | .34 | .80 | 33 |
| 106C | 15.5 | 0 | .17 | .53 | .30 | 0.71 | .11 | .56 | .33 | .80 | 32 |

*SEC was not obtained for this sample.

TABLE 1A

| Sample | Additive | Wt. % Additive | Polymer Si $T^1$ | $T^2$ | $T^3$ | Polymer P* | Approx. # Arms |
|---|---|---|---|---|---|---|---|
| 105B | Ti(OR)$_4$ | 10.5 | 0 | .68 | .32 | >.78 | 36 |
| 106H | Zr(OR)$_4$ | 13.5 | 0 | .82 | .18 | >.73 | 37 |

*polymer p must be greater than this value. Actual values are impossible to measure due to resonance overlap in the $^{29}$Si NMR Spectra. Q values do not apply since the inorganic monomer does not contain silicon.

Tables 1 and 1A above refer to $T^0$, $T^1$, $T^2$, and $T^3$ silicons and give the relative amount of each type contributed by the polymer arms. A silicon atom which is not bonded to another silicon atom via an oxygen bridge is a $T^0$ silicon. Silicon atoms connected to one other silicon through an oxygen bridge are $T^1$ silicons. Hence, each silicon in the moiety Si—O—Si is a $T^1$ silicon. Similarly, $T^2$ and $T^3$ silicons are bonded via oxygen bridges to two or three other silicon atoms, respectively.

Table 1 includes silicon atoms in the inorganic core contributed by the reactant Si(OCH$_3$)$_4$, i.e. "TMOS". The silicon atoms in the core are characterized as $Q^2$, $Q^3$ and $Q^4$ silicons. In this designation, $Q^2$ silicons are bonded via oxygen bridges to two other silicon atoms. Likewise $Q^3$ and $Q^4$ silicons are bonded via oxygen bridges to three or four other silicons, respectively.

Table 1 also refers to "p" values for the inorganic cores in the organic/inorganic composite products. The value for p is the ratio of actual metal condensation bonds to total possible number of such bonds. The ratio is defined above in this Specification.

The number of arms set forth in Table 1 is estimated by comparison of the molecular weight of the starting materials with the products.

Table 2 reports the Tg data obtained as discussed above.

TABLE 2

| Sample | Additive | Wt. % Additive | Tg (°C.) |
|---|---|---|---|
| 93B | TMOS | 9.6 | 91 |
| 105B | Ti(OR)$_4$ | 10.5 | 91 |
| 106H | Zr(OR)$_4$ | 13.5 | 86 |
| 105A | — | 0 | 96 |

TMOS = Si(OCH$_3$)$_4$

The trend from a Tg of 96° C. for PS-phTMOS reacted alone down to 91°-94° C. when TMOS was added to 91° C. with titanium and 86° C. with zirconium is surprising and still unexplainable, but reproducible. This could possibly be attributed to a two phase morphology since the Tg of the arm was ~86° C. It is significant that all Tg's were below that of polystyrene (polystyrene Tg=103° C.). A maximum Tg of 96° C. rather than 103° C. is attributed to chain end effects (due to the star-shaped architecture).

Of the compositions provided by this invention, certain are preferred. Thus for example, it is preferred that the organic arms attached to the core have the formula:

T—P—E— wherein E is a benzyl group. In other words, it is preferred that the arms have the group

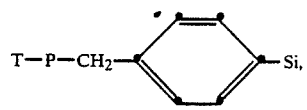

It is also preferred that T be an alkyl radical having 2 to about 6 carbon atoms; more preferably that it be a butyl radical such as sec-butyl. It is also preferred that the polymeric unit P be a poly(vinylaromatic) or poly(diene). It is also preferred that metal contributed by the inorganic modifier be Si, Zr, or Ti. In those instances where the composites of this invention are to be used to make articles used in optics and similar fields where index of refraction is important, it is preferred that a significant portion of the metal atoms in the core be titanium (N$_D$=2.2 for TiO$_2$). This value of refractive index is high compared to other inorganic oxides.

In one embodiment it is preferred that the ratio of metal condensation bonds be within the range of about 0.7 to about 0.9 so that the composites have appreciable residual M—OH to provide residual reactivity. In another embodiment, composites having little or no residual activity are desired, so that they are more stable under use conditions.

Composites within the preferred embodiments can be made as described above. Preferably, the prehydrolysis step and the condensation step are conducted in the presence of an organic solvent such as tetrahydrofuran, dioxane, dimethylsulfoxide N-methylpyrrollidone, and the like. Preferably the process steps are conducted at about ambient temperature. Preferably the inorganic modifier MX$_n$ is a silicon, zirconium, or titanium alkoxide wherein each alkoxide group has 1-4 carbon atoms. The invention has been described above with particular reference to preferred embodiments. A skilled practitioner familiar with the above detailed description can make many changes without departing from the scope and spirit of the appended claims.

We claim:

1. An organic/inorganic composite, said composite having an inorganic core, and a plurality of organic polymer arms chemically bonded to said core, said core being a partially condensed metal polycondensate of silicon, zirconium, titanium, aluminum, lead, boron or tin, wherein (a) the ratio of metal condensation bonds, M—O—M, in said core to the total number of possible metal condensation bonds is within the range of from about 0.7 to about 0.9, and (b) in the metal non-condensation bonds having the formula M—OR, R is selected from hydrogen and lower alkyl groups of up to about four carbon atoms;

said core being further characterized by having a metal content such that the ratio of moles of metal contributed by the ends of said polymer arms bonded to said core, to the total moles of metal in said core is within the range of from about 0.25/1 to about 4/1;

said core being still further characterized by being from about 5 to about 30 weight percent of said composite;

said arms having the formula:

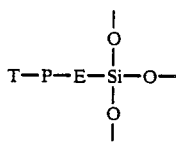

wherein (a) the silicon atom is a metal atom contributed by the end of the polymer arm to said core, (b) at least one of the Si—O— bonds is bonded directly to said core, or indirectly to said core through another silicon atom in another polymer arm, and any remaining Si—O— bonds are attached to R wherein R is as defined above, T is selected from an initiator fragment, P is a poly(vinylaromatic) or poly(diene) chain, and E is a benzyl group or a substituted benzyl group having up to about 12 carbon atoms;

said composite being further characterized by each of said polymer arms having a molecular weight of from about 1000 to about 100,000, and the average number of arms bonded to said core being from about 3 to about 50.

2. A composite of claim 1 wherein T is an alkyl group of two to about 6 carbon atoms.

3. A composite of claim 1 wherein P is polystyrene.

4. A composite of claim 3 wherein said polystyrene chain has a molecular weight of from about 1000 to about 100,000.

5. A composite of claim 1 having from about 5 to about 50 polymer arms.

6. A composite of claim 1 wherein said core is from about 5 to about 30 weight percent of the composite.

7. A composite of claim 1 wherein metal atoms in said core are selected from silicon, zirconium and titanium.

8. A composite of claim 7 wherein said metal is silicon.

9. A composite of claim 1 wherein the ratio of actual metal condensation bonds to possible metal condensation bonds is from about 0.7 to about 0.9.

10. A process for preparing an organic/inorganic composite having an inorganic core, and a plurality of organic polymer arms chemically bonded to said core, said process comprising two steps, the first step comprising reacting (i) one mole portion of an end-capped polymer having the formula: T—P—E—Si(OR)$_3$ wherein T is selected from an initiator fragment each R is independently selected from hydrogen and straight chain alkyl radicals having up to about 4 carbon atoms, E is a benzyl or substituted benzyl group having up to about 12 carbon atoms, and P is a poly(vinylaromatic) or poly(diene) chain, with (ii) about 4 mole portions of water in the presence of an acid catalyst to prepare a prehydrolyzed intermediate to convert from about 50 to about 100 percent of the number of (OR) groups to OH, thereby forming a prehydrolyzed intermediate; and in second step reacting said intermediate with from 0.25 to about 4 moles per mole of said intermediate with a hydrolyzable metal compound MX$_n$, wherein M is selected from Si, Zr, Ti, Al, Pb, B, or Sn, and X is a hydrolyzable group selected from halogen and alkoxy groups of one to about four carbon atoms;

said second step being further characterized by being conducted in the presence of an acidic catalyst, wherein an organic/inorganic composite is formed.

* * * * *